United States Patent
Bengtsson, Sr. et al.

(10) Patent No.: US 6,719,111 B2
(45) Date of Patent: Apr. 13, 2004

(54) SYNCHRONIZING DEVICE IN A MOTOR VEHICLE GEARBOX

(75) Inventors: Lars Bengtsson, Sr., Vallda (SE); Peter Wittke, Uddevalla (SE); Richard Torsein, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 10/065,177

(22) Filed: Sep. 24, 2002

(65) Prior Publication Data

US 2003/0089571 A1 May 15, 2003

(30) Foreign Application Priority Data

Nov. 9, 2001 (GB) .......................................... 01850193

(51) Int. Cl.$^7$ ............................................... F16D 23/06
(52) U.S. Cl. .............................. 192/53.32; 192/53.341; 74/339
(58) Field of Search ........................ 192/53.34, 53.342, 192/53.32, 53.3, 53.31, 53.341; 74/339

(56) References Cited

U.S. PATENT DOCUMENTS

| | | | | |
|---|---|---|---|---|
| 4,189,041 A | * | 2/1980 | Muller ..................... | 192/53.34 |
| 4,817,773 A | * | 4/1989 | Knodel et al. ......... | 192/53.341 |
| 4,836,348 A | * | 6/1989 | Knodel et al. ......... | 192/53.341 |
| 4,905,806 A | * | 3/1990 | Hillenbrand et al. ... | 192/53.343 |
| 5,135,087 A | * | 8/1992 | Frost ....................... | 192/53.31 |
| 2002/0100655 A1 | * | 8/2002 | Patzner et al. ............. | 192/53.1 |

FOREIGN PATENT DOCUMENTS

| | | |
|---|---|---|
| DE | 4224271 A1 | 1/1994 |
| EP | 0515243 B1 | 11/1992 |
| EP | 0515243 B2 | 11/1992 |
| EP | 0515243 A1 | 11/1992 |
| EP | 0994267 A | 4/2000 |

* cited by examiner

*Primary Examiner*—Saúl Rodriguez
(74) *Attorney, Agent, or Firm*—David B. Kelley

(57) ABSTRACT

Synchronizing device in a motor vehicle gearbox, comprising a synchronizer hub (1), an engaging sleeve (2) non-rotatably but axially displaceably mounted on the hub, an outer and an inner synchronizing ring (8a, 13) on one side of the hub and a single synchronizing ring (8b) on the other side of the hub. The engaging sleeve has first, and second groups of internal teeth (4a, 4b), each group being divided into three sets of teeth and each set in one group adjoining a set in the other group. The outer synchronizing ring has three sets of blocker teeth (9a) facing the engaging sleeve teeth (4a) of the sets of the first group and lacks teeth in intermediate areas (19a), while said single synchronizing ring (8b) has three sets of blocker teeth (9b) facing the engaging sleeve teeth (4b) of the sets of the second group and lack teeth in intermediate areas (19b).

12 Claims, 2 Drawing Sheets

SYNCHRONIZING DEVICE IN A MOTOR VEHICLE GEARBOX

BACKGROUND OF INVENTION

1. Field of the Invention

The present invention relates to a synchronizing device in a motor vehicle gearbox.

2. Background Art

When shifting gears in a gearbox of this kind the time it takes to complete the engagement process and the force that the driver has to apply on the gear shift lever largely depend on the size of the blocking angle of the teeth on the engaging sleeves and on the synchronizing rings. A large blocking angle requires a larger force on the gear shift lever and a longer synchronizing and engagement time. On the other hand one assures that the synchronizing process is completed when the teeth of the engaging sleeve engage with the teeth of the clutch discs. A smaller blocking angle requires less force on the gear shift lever and a shorter time before the engaging sleeve engages the clutch discs, but instead there is a risk that the synchronizing process has not been completed when the teeth of the engaging sleeve hit the teeth of the clutch disc.

Since the friction torque is larger in multi synchronizing ring synchronizer systems than in single ring synchronizer systems; one can use synchronizing rings with a smaller blocking angle in multi (double or triple) ring systems than in single ring systems without risking that the synchronizing process has not been completed before the teeth of the engaging sleeve hit the teeth of the clutch discs. It is known in the art to use both single and multi ring synchronizer systems in a single gearbox. Usually multi ring synchronizer systems are used for the lower gears, e.g. first, second and third gears, which require larger synchronizing torque than the higher gears. Usually single ring systems are used for the higher gears.

In order to optimize shift quality in such gearboxes the components of the multi ring synchronizer systems should have teeth with a smaller blocking angle than the single ring synchronizer systems. However, this requires the manufacture and the assembly of, among other things, at least two and in some cases even three, different engaging sleeves, one having teeth with a smaller blocking angle at both ends, one having teeth with a larger blocking angle at both ends and one having teeth with a smaller angle at one end and a larger angle at the opposite end. Of course this increases the cost compared with a gearbox having only one kind of engaging sleeve. There is also a risk for mixing the various engaging sleeves when assembling the gearboxes. In order to reduce costs and eliminate the risk for errors in the assembling process it is previously known to use engaging sleeves having the same blocking angle for single and multi ring synchronizer systems. In such cases a larger than necessary blocking angle has to be used for the multi ring synchronizer systems which means that shift quality will not be optimized for all gears.

SUMMARY OF INVENTION

A purpose of the present invention is to achieve a synchronizing device of the type described by way of introduction, by means of which it possible to use one and the same engaging sleeve for synchronizing rings and clutch discs having teeth with different blocking angles.

This is achieved according to the invention by virtue of the fact that the teeth on the engaging sleeve are divided into at least a first and a second group, the teeth of the first group having V-shaped end surfaces with a first blocking angle while the teeth of the second group have V-shaped end surfaces with a second blocking angle different from the first blocking angle, and that the first synchronizing ring has blocker teeth with a V-shaped end surface having said first blocking angle in areas facing said first teeth group on the engaging sleeve and lacks teeth in intermediate areas facing the second teeth group, while the second synchronizing ring has blocker teeth with a V-shaped end surface having said second blocking angle in areas facing said second teeth group and lacks blocker teeth in intermediate areas facing the first teeth group.

A synchronizer according to this invention includes a synchronizer hub, intended to be non-rotatably joined to a shaft in a gearbox, an engaging sleeve, which is non-rotatably but axially displaceably mounted on the synchronizer hub by means of interengaging external teeth on the synchronizer hub and internal teeth on the engaging sleeve, first and second clutch discs provided with external teeth and mounted on each side of the synchronizer hub, said discs being designed to be non-rotatably joined to a first and second gear wheel rotatably mounted on said shaft on each side of the synchronizer hub and being lockable relative to the synchronizer hub by axial displacement of the engaging sleeve from a neutral to an engaging position, in which the internal teeth on the engaging sleeve engage with the external teeth on the clutch discs, and first and second synchronizing rings mounted on each side of the synchronizer hub between the hub and the clutch discs, each synchronizing ring having external blocker teeth engaging with the internal teeth on the engaging sleeve and an internal conical friction surface engaging with an external friction surface on an element non-rotatably joined to each clutch disc when the engaging sleeve is displaced from the neutral position to an engaging position, the internal teeth on the engaging sleeve having opposite V-shaped end surfaces facing corresponding V-shaped surfaces on the synchronizing ring blocker teeth and the clutch disc teeth.

The invention is based on the fact that it is not necessary that teeth along the whole circumference of the engaging sleeve and the synchronizing rings are effective to transmit torque during the synchronizing process. When teeth along the whole circumference of the engaging sleeve and the synchronizing ring are divided into two groups only half of the total amount of teeth are effective on each side.

BRIEF DESCRIPTION OF DRAWINGS

The invention will be described in more detail below with reference to the accompanying drawings, where.

DETAILED DESCRIPTION

Figure 1A:
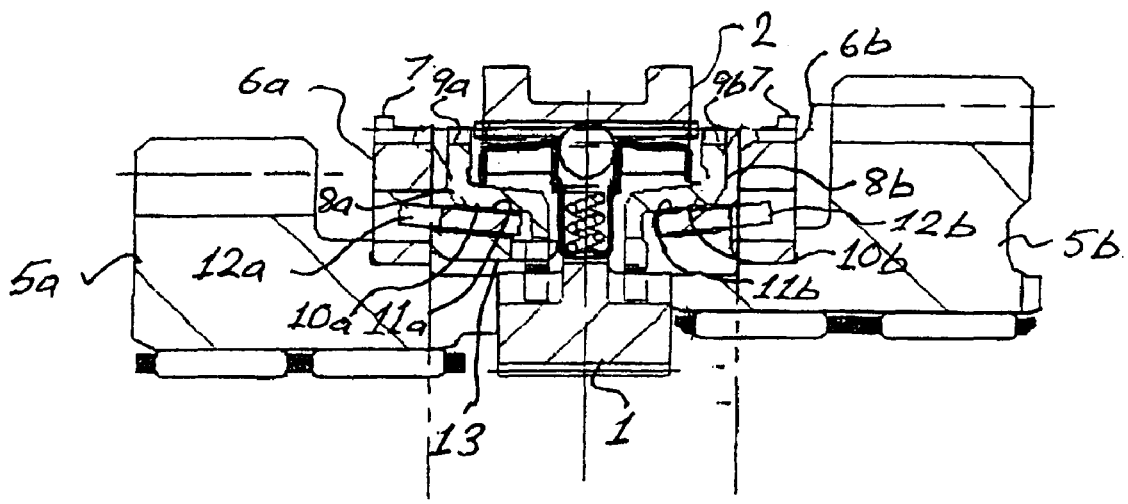
FIGS. 1a and 1b show a longitudinal section and a plan view of an embodiment of a synchronizing device according to the invention.

The synchronizing device shown in FIG. 1a is based on a well known kind of synchronizing device and only components necessary for the understanding of the invention will be described here. The synchronizing device comprises a synchronizer hub 1 which is intended to be non-rotatably joined to a shaft (not shown) in a gearbox housing. An engaging sleeve 2 is non-rotatably but axially displaceably mounted on the synchronizer hub 1 by means of interengaging external teeth 3 on the hub 1 and two groups of different internal teeth 4a and 4b on the engaging sleeve 2, as will be described in more detail with reference to FIGS. 1b, 2 and 3. On either side of the hub 1 there is a gear wheel 5a and 5b, respectively, which is rotatably mounted on said shaft. A clutch disc 6a and 6b, provided with external teeth 7 along the whole circumference, is non-rotatably joined to each gear wheel 5a and 5b. A first and a second outer synchronizing ring 8a and 8b is non-rotatably but axially displaceably mounted on the synchronizer hub 1. The rings 8a and 8b have external blocker teeth 9a and 9b and internal conical friction surfaces 10a and 10b facing external conical friction surfaces 11a and 11b on intermediate ring elements 12a and 12b, which are non-rotatably joined to each clutch disc 6a and 6b. An inner synchronizing ring 13 is non-rotatably joined to the synchronizing ring 8a radially inside the the intermediate ring element 12a. Thus, the synchronizing ring 8a, the intermediate ring element 12a and the inner synchronizer ring 13 are part of a multi (twin) ring system while the synchronizing ring 8b and the intermediate ring element 12b are part of a single ring system. Usually in single ring systems instead of having a separate ring element 12b with an external friction surface 11b joined to the gear wheel, a corresponding friction surface is machined in one piece with the gear wheel.

Figure 2:
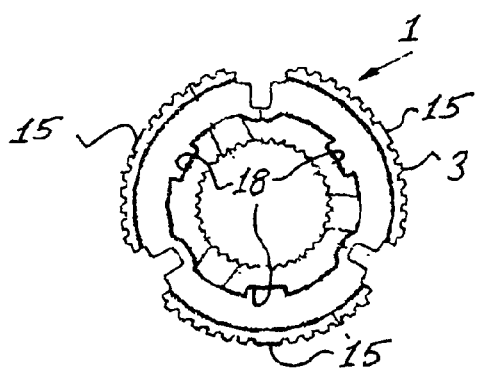
FIGS. 2, 3, 4a and 4b show end views of a synchronizer hub, an engaging sleeve, a first synchronizing ring and a second synchronizing ring, respectively, of the synchronizing device shown in FIGS. 1a and 1b.
Figure 3:
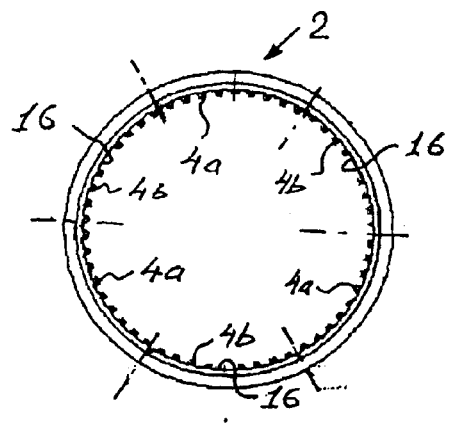
Figure 4A:
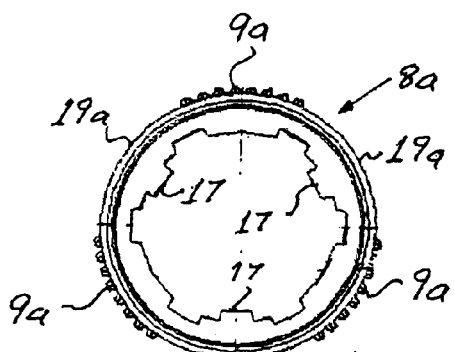
Figure 4B:
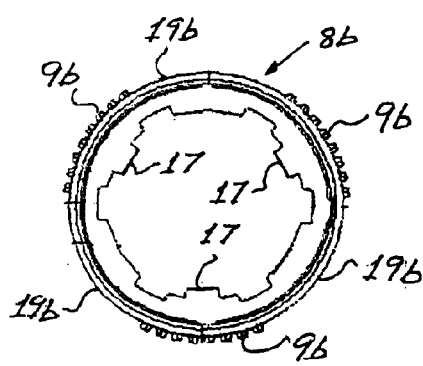

As shown in FIG. 2, the synchronizer hub 1 has three teeth 15, which are wider than the teeth 3 and spaced 120° from each other. The engaging sleeve 2 (FIG. 3) has corresponding grooves 16. When mounting the engaging sleeve 2 on the synchronizer hub 1 the sleeve can only be mounted in an angular position in which the teeth 15 fit in the grooves 16. As stated above, the engaging sleeve 2 has two groups of different kinds of internal teeth 4a and 4b. Each group is divided into three alternating sets of teeth, each set extending 60° peripherally. The described features guarantee a predetermined position of the teeth on the engaging sleeve 2 in relation to the hub 1. FIGS. 4a and 4b disclose the synchronizing rings 8a and 8b, which have internal teeth 17 engaging external grooves 18 on the synchronizing hub 1 to locate each synchronizing ring in a predetermined position in relation to the engaging sleeve 2. The blocker teeth 9a and 9b on the synchronizing rings 8a and 8b, respectively, are grouped into three sets, each set extending 60° peripherally and separated by areas 19a and 19b lacking blocker teeth. As can be seen in FIGS. 4a and 4b the blocker teeth 9a and the areas 19a on the synchronizing ring 8a are displaced 60° in relation to the blocker teeth 9b and the areas 19b on the synchronizing ring 8b, respectively.

When the engaging sleeve 2 is displaced to the left from the neutral position shown in FIG. 1a, the teeth 4a on the engaging sleeve 2 engage with the blocker teeth 9a on the outer synchronizing ring 8a. The teeth 4b facing the areas 19a, which lack blocker teeth, pass freely over the synchronizing ring when the synchronizing process is completed, and the engaging sleeve is finally displaced to its left-hand end position in which the teeth 4a and 4b engage with the teeth 7 on the clutch disc 6a. Similarly, when the engaging sleeve 2 is displaced to the right from the neutral position, the teeth 4b engage with the blocker teeth 9b on the synchronizing ring 8b. The teeth 4a facing the areas 19b, which lack blocker teeth, pass freely over the synchronizing ring 8b when the synchronizing process is completed, and the engaging ring is finally displaced to its right hand end position in which the teeth 4a and 4b engage with the teeth on the clutch disc 6b.

Figure 1B:
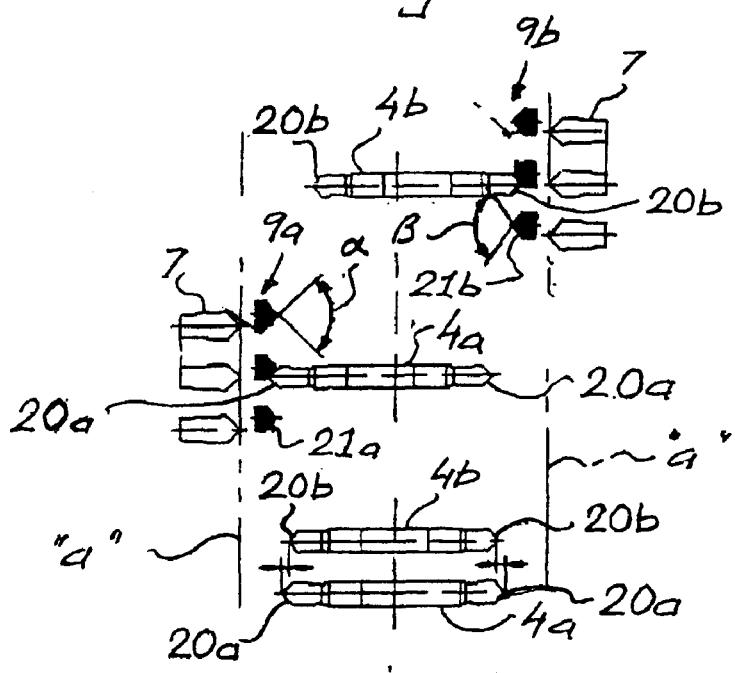

As shown in FIG. 1b the teeth 4a and 4b on the engaging sleeve 2 and the blocker teeth 9a and 9b on the synchronizing rings 8a and 8b have V-shaped end surfaces 20a, 20b, 21a and 21b, respectively. The end surfaces 20a of the teeth 4a on the engaging sleeve 2, and the end surface 21a on the blocker teeth 9a of the left synchronizing ring 8a have a blocking angle α which is approximately 90°, while the end surfaces 20b of the teeth 4b on the engaging sleeve 2 and the end surfaces 21b on the blocker teeth of the right synchronizing ring 8b have a blocking angle β which is approximately 120°, thereby adapting the blocking angles to the friction torque differences between a single synchronizing ring synchronizer and a twin synchronizing ring synchronizer. As can be seen in FIG. 1b the teeth 4a on the engaging sleeve 2 are longer in the direction of the axis of rotation than the teeth 4b, which means that the teeth 4a will hit the plane of rotation "a" of the tips of the teeth 7 on the clutch discs 6a and 6b before the teeth 4b. An advantage of this feature is that, after the synchronizing process is completed, final engagement of the engaging sleeve with the clutch discs 6a and 6b will start with the engagement of the engaging sleeve teeth 4a having the smaller angle with the clutch disc teeth 7 both when engaging the gear wheel 5a having the twin synchronizing system and the gear wheel 5b having the single synchronizing ring system. Thus, the torque indexing the engaging sleeve teeth 4a and 4b and the clutch disc teeth 7 will be the same in both cases.

The invention has been described above with reference to an embodiment with a synchronizing device having a common engaging sleeve for a multi ring synchronizing system, e.g. for a third gear, and a single ring synchronizing system, e.g. for a fourth gear on either side of a synchronizer hub.

Within the scope of the invention an engaging sleeve having the features described above could also be used for engaging opposite gear wheels having a common engaging sleeve, both of which have single synchronizing ring systems. If, for instance, in a gearbox the same engaging sleeve should be used for a fifth gear and reverse, a first group of teeth on the engaging sleeve having a small blocking angle together with a synchronizing ring with teeth with a small blocking angle could be used for reverse and a second group of teeth with larger teeth together with a synchronizing ring with larger teeth could be used for the fifth gear, since reverse is normally engaged when the vehicle is moving very slowly or not at all.

What is claimed is:

1. A synchronizing device for a motor vehicle gearbox, comprising:

a synchronizer hub having first external teeth, the hub being non-rotatably joined to a shaft in the gearbox;

an engaging sleeve having internal teeth, non-rotatably and axially displaceably mounted on the synchronizer hub by engagement of the external teeth on the synchronizer hub with the internal teeth on the engaging sleeve;

a first gear and second gear rotatably mounted on said shaft, each gear located on an opposite side of the synchronizer hub and being lockable relative to the synchronizer hub by axial displacement of the engaging sleeve from a neutral to an engaging position;

first and second clutch discs, each disc mounted on an opposite side of the synchronizer hub, having external teeth and having an element connected rotatably to a clutch disc, said first clutch disc being adapted for connection to the first gear for rotation therewith, said second clutch disc being adapted for connection to the second gear for rotation therewith, the internal teeth on the engaging sleeve engaging alternately with the external teeth on the clutch discs; and first and second synchronizing rings, each ring mounted on an opposite side of the synchronizer hub and located between the hub and a clutch disc, each synchronizing ring having external blocker teeth adapted to engage the internal teeth on the engaging sleeve, and having an conical surface adapted for engagement with a surface of said element when the engaging sleeve is displaced from the neutral position to an engaging position, the internal teeth on the engaging sleeve having V-shaped end surfaces facing corresponding V-shaped surfaces on the synchronizing ring blocker teeth and the clutch disc teeth, the teeth on the engaging sleeve being divided into a first group and a second group, the teeth of the first group having V-shaped end surfaces with a first blocking angle, the teeth of the second group having V-shaped end surfaces with a second blocking angle different from the first blocking angle, the first synchronizing ring having blocker teeth with a V-shaped end surface having said first blocking angle only in areas facing said first group on engaging sleeve and lacking teeth in intermediate areas facing the second group, the second synchronizing ring having blocker teeth with a V-shaped end surface having said second blocking angle in areas facing said second teeth group and lacking blocker teeth in intermediate areas facing the first group.

2. The synchronizing device according to claim 1, wherein the synchronizer hub and engaging sleeve have cooperating guide heels and guide grooves for locating the engaging sleeve in a predetermined angular position on the synchronizer hub.

3. The synchronizing device according to claim 1, wherein the synchronizer hub and the first and the second synchronizing rings have cooperating guide grooves and guide heels for locating the synchronizing rings in first and second predetermined angular positions, wherein the blocker teeth of the first and the second synchronizing rings face the first group and second group, respectively.

4. The synchronizing device according to claim 1, wherein the first group and second group are divided into three sets of teeth, each set in one of the first group and second group adjoins a set in another group.

5. A synchronizing device for a motor vehicle gearbox, comprising:
   a synchronizer hub having first external teeth, the hub being non-rotatably joined to a shaft in the gearbox;
   an engaging sleeve having internal teeth, non-rotatably and axially displaceably mounted on the synchronizer hub by engagement of the external teeth on the synchronizer hub with the internal teeth on the engaging sleeve;
   first and second clutch discs, each disc mounted on an opposite side of the synchronizer hub, having external teeth and having an element connected rotatably to a clutch disc, said first clutch disc being adapted for connection to the first gear for rotation therewith, said second clutch disc being adapted for connection to the second gear for rotation therewith, the internal teeth on the engaging sleeve engaging alternately with the external teeth on the clutch discs;
   first and second synchronizing rings, each ring mounted on an opposite side of the synchronizer hub and located between the hub and a clutch disc, each synchronizing ring having external blocker teeth engaging with the internal teeth on the engaging sleeve, and an internal conical friction surface engaging with an external friction surface located on an element non-rotatably connected to a clutch disc when the engaging sleeve is displaced from the neutral position to an engaging position, the internal teeth on the engaging sleeve having opposite V-shaped end surfaces facing corresponding V-shaped surfaces on the synchronizing ring blocker teeth and the clutch disc teeth, wherein the teeth on the engaging sleeve are divided into a first group and a second group, the first group having V-shaped end surfaces with a first blocking angle, the second group having V-shaped end surfaces with a second blocking angle different from the first blocking angle, the first synchronizing ring having blocker teeth with a V-shaped end surface having said first blocking in areas facing said first teeth group on the engaging sleeve and lacking teeth in intermediate areas facing the second blocker teeth group, the second synchronizing ring having blocker teeth with a V-shaped end surface having said second blocking angle in areas facing said second teeth group and lacking blocker teeth in intermediate areas facing the first blocker teeth group; and
   a third synchronizing ring being mounted concentrically with and radially inside one of the first and second synchronizing rings, teeth on the engaging sleeve facing multiple synchronizing rings having a blocking angle that is smaller than the blocking angle of teeth facing the single synchronizing ring.

6. The synchronizing device according to claim 5, wherein the synchronizer hub and the engaging sleeve have co-operating guide heels and guide grooves for locating the engaging sleeve in a predetermined angular position on the synchronizing hub.

7. The synchronizing device according to claim 5, wherein the synchronizer hub and the first and the second synchronizing rings, have co-operating guide grooves and guide heels for locating the synchronizing rings in first and second predetermined angular positions, wherein the blocker teeth of the first and the second synchronizing rings face the first and the second group of teeth on the engaging sleeve, respectively.

8. The synchronizing device according to claim 5, wherein the internal teeth on the engaging ring having the smaller blocking angle have a larger axial extension than the internal teeth on the engaging ring having the larger blocking angle.

9. A synchronizing device for a motor vehicle gearbox, comprising:
   a synchronizer hub having first external teeth;
   an engaging sleeve having internal teeth, non-rotatably and axially displaceably mounted on the synchronizer hub by engagement of the external teeth on the synchronizer hub with the internal teeth on the engaging sleeve;
   a gear located on an axial side of the synchronizer hub, and alternately driveably connected and disconnected to the synchronizer hub in response to oppositely directed axial displacement of the engaging sleeve;
   a clutch disc supported for rotation and located axially between the gear and synchronizer hub, having external teeth, said clutch disc being adapted for driveable connection to the gear, the internal teeth on the engaging sleeve adapted to engage with the external teeth on the clutch disc; and
   a synchronizing ring supported for rotation and located axially between the clutch disc and synchronizer hub, having external blocker teeth adapted to engage the internal teeth on the engaging sleeve, and adapted for frictional engagement with the clutch disc when the engaging sleeve is displaced toward the gear, the internal teeth on the engaging sleeve having V-shaped end surfaces facing V-shaped surfaces on the synchronizing ring blocker teeth and the clutch disc teeth, the teeth on the engaging sleeve being divided into a first group and a second group, the teeth of the first group having V-shaped end surfaces with a first blocking angle, the teeth of the second group having V-shaped end surfaces with a second blocking angle different from the first blocking angle, the synchronizing ring having blocker teeth with a V-shaped end surface having said first blocking angle located only in areas facing said first group on the engaging sleeve and lacking teeth in intermediate areas facing the second group.

10. The synchronizing device according to claim 1, wherein the synchronizer hub and engaging sleeve have cooperating guide heels and guide grooves for locating the engaging sleeve in a predetermined angular position on the synchronizer hub.

11. The synchronizing device according to claim 1, wherein the synchronizer hub and the synchronizing ring has cooperating guide grooves and guide heels for locating the synchronizing ring in first and second predetermined angular positions, wherein the blocker teeth of the synchronizing ring face the first group and second group, respectively.

12. The synchronizing device according to claim 1, wherein the first group and second group are divided into three sets of teeth, each set in one of the first group and second group adjoins a set in another group.

* * * * *